United States Patent [19]

Ideta

[11] Patent Number: 5,797,021
[45] Date of Patent: Aug. 18, 1998

[54] INFORMATION PROCESSING APPARATUS FOR EMULATION

[75] Inventor: Masako Ideta, Tokyo, Japan

[73] Assignee: NEC Corporation, Tokyo, Japan

[21] Appl. No.: 506,496

[22] Filed: Jul. 25, 1995

[30] Foreign Application Priority Data

Jul. 25, 1994 [JP] Japan .................................. 6-172541

[51] Int. Cl.$^6$ .................................. G06F 9/46; G06F 13/14
[52] U.S. Cl. .......................... 395/734; 395/733; 395/736; 395/739
[58] Field of Search .......................... 395/734, 733, 395/737, 736, 732, 500, 740, 741, 742, 868, 869, 870

[56] References Cited

U.S. PATENT DOCUMENTS

| 4,031,517 | 6/1977 | Hirtle | 395/733 |
| 4,514,805 | 4/1985 | McDonough et al. | 395/733 |
| 4,727,480 | 2/1988 | Albright et al. | 395/733 |
| 5,093,776 | 3/1992 | Morss et al. | 395/500 |
| 5,155,853 | 10/1992 | Mitsushira et al. | 395/733 |
| 5,159,688 | 10/1992 | Matsushima et al. | 395/733 |
| 5,261,107 | 11/1993 | Klim et al. | 395/733 |
| 5,291,606 | 3/1994 | Okayama et al. | 395/734 |
| 5,471,620 | 11/1995 | Shimizu et al. | 395/375 |
| 5,555,413 | 9/1996 | Lohman et al. | 395/733 |
| 5,590,312 | 12/1996 | Marisetty | 395/500 |
| 5,708,815 | 1/1998 | Poisner | 395/736 |

FOREIGN PATENT DOCUMENTS 2266605  11/1993  United Kingdom.

OTHER PUBLICATIONS

R. Jigour, "Using the 3259A Programmable Interrupt Controller", *Microsystem Components Handbook*, Intel Corporation (1985).

Primary Examiner—Ayaz R. Sheikh
Assistant Examiner—Raymond N. Phan
Attorney, Agent, or Firm—Sughrue, Mion, Zinn, Macpeak & Seas, PLLC

[57] ABSTRACT

An INTC and a CPU are interconnected via a bus. A first line through which an interrupt request signal is transferred to the CPU from the INTC, and a second line through which an interrupt reception signal is transferred from the CPU to the INTC. The INTC outputs both of a vector address and an interrupt mode signal to a bus in response to the interrupt reception signal. The CPU receives the vector address and the interrupt mode signal and carries out the interrupt processing on the basis of these signals. In this way, since the INTC outputs both the vector address and the interrupt processing mode signal by using the bus, it is possible to reduce a number of terminals for connecting the CPU and the INTC with each other.

8 Claims, 13 Drawing Sheets

INFORMATION PROCESSING APPARATUS FOR EMULATION

BACKGROUND OF THE INVENTION

1. Field of the Invention

The present invention relates to an information processing apparatus and, more particularly, to a one-chip microcomputer having an interrupt control circuit.

2. Description of the Related Art

As well known in the art, an interrupt control unit intervenes between a central processing unit (CPU) and a plurality of peripheral units to interface therebetween. When a certain peripheral unit issues an operation request, the interrupt control unit notifies the CPU of the request by means of a plurality of interrupt control signals. In response thereto, the CPU suspends the current program execution and then performs an interrupt processing operation.

FIG. 10 illustrates a structure of a connection established between a conventional interrupt control circuit and a CPU in a one-chip microcomputer 1b as a peripheral circuit; FIG. 11, the interrupt control circuit; and FIG. 12, a timing chart of the interrupt control circuit. The one-chip microcomputer 1b receives data from an external unit by the interrupt processing, and a description will be hence given as to the processing of the interrupt control circuit 2b (referred to as an INTC hereinbelow) in connection with FIG. 11. When the INTC 2b receives each interrupt signal 4b (referred to as an INTXX hereinbelow) generated from a peripheral portion 19b which controls the input/output with respect to an external terminal 39b or any external unit and produces an interruption at a predetermined timing, an INTC control portion 5b turns an interrupt flag 30b (referred to as an IF hereinbelow) corresponding with the INTXX to "1". The INTC control portion 5b judges whether the reception of interruption is possible on the basis of a flag 31b (referred to as an MK hereinbelow) for masking the interruption, flags 34b (referred to as a PR0 and a PR1 hereinbelow) for determining the priority of the interruption and an interrupt permission signal 16b (referred to as an EI hereinbelow). In the case where the reception of interruption is enabled, an interrupt request signal 6b (referred to as an INTRQ hereinbelow) is turned to "1", and signals 9b and 10b (referred to as an MSINTB and a CSEN hereinbelow) representing a mode of the interrupt processing are simultaneously output on the basis of flags 32b and 33b (referred to as an MS and a CS hereinbelow) showing a mode of the interrupt processing. As modes of the interrupt processing, a vector interruption, a context switching (a register bank switching) and a macro service are prepared. In the case where the reception of interruption is disabled, the IF 30b corresponding with the INTXX 4b is flagged, and the INTRQ 6b is turned to "1" when the reception of interruption becomes enabled. Further, upon receiving a signal 29 (referred to as a OEVC hereinbelow) requesting interrupt address data (referred to as a vector address (VC) 8b hereinbelow), the INTC control portion 5b outputs the VC 8b as data to an existing data bus 11b (referred to as an IBUS hereunder) and simultaneously turns to "1" a flag corresponding with a priority of the interruption currently being received within a register 15b (referred to as an ISPR hereinbelow) maintaining a priority level of the interrupt request being received. Furthermore, upon receiving control signals 12b and 13b (referred to as a CLRIF and a CLRMS hereinbelow) which turn the IF 30b and the MS 31b within the INTC 2b to "0" or a control signal 14b (referred to as a CLRIP hereunder) which turns a flag corresponding with a priority within the ISPR to "0", the INTC control portion 5b turns a corresponding flag to "0".

Next, a description will now be given as to the processing at the time of interruption with reference to FIGS. 10 and 12. When the INTXX 4b is input to the INTC 2b, the INTC 2b judges whether the reception of interruption is enabled. If the reception of interruption is enabled, the INTC 26b turns the INTRQ 6b to "1". The CPU 3b samples the INTRQ 6b during the execution of each command, and flags the OEVC 29 with "1" to start the interrupt processing if the INTRQ 6b is "1". When the OEVC 29 is flagged with "1", the INTC 2b outputs the VC 8b as data to the IBUS 11b, and simultaneously outputs the MSINTB 9b and the CSEN 10b corresponding with a mode of the interrupt processing. The CPU 3b performs the interrupt processing on the basis of the processing mode directed by the control signals MSINTB 9b and CSEN 10b. The CPU 3b turns the control signal CLRIF 12b to "1" in the case where the vector interrupt processing corresponding with the INTXX 4b is accepted by the CPU 3b; the control signal CLRMS 13b to "1" in the case where the macro service processing is executed for a predetermined number of times; and the control signal CLRIP 14b to "1" in the case where a subroutine of the interruption whose mode has been requested is completed. With these control signal lines, the INTC 2b turns the corresponding flag to "0".

The address latch signal 18b is a timing signal for latching an address from the IBUS 11b when accessing to a register within the INTC 2b, and RELSTB 17b is a request signal for releasing the state of a standby mode which realizes the low power operation.

The structure within the emulation apparatus for use in debugging in the microcomputer will now be described in connection with FIG. 13.

In case of carrying out the emulation with respect to the microcomputer (a target board) developed by a user, the peripheral circuit of the microcomputer which is used in an actual product may be connected to the target board and the fact that a peripheral circuit normally operates may be confirmed. As its measure, a terminal of the peripheral circuit and a corresponding terminal of the target board may be connected with each other to be brought to an actual operation. Even if the peripheral circuit 1b such as shown in FIG. 10 is connected as a peripheral circuit of the microcomputer, the internal information of the CPU 3b can not be however obtained. Further, if the CPU 3b is provided with an emulation function, the scale of the CPU 3b extremely increases and a remarkably-large chip is realized as an actual microcomputer. Accordingly, the CPU 3b and the INTC 2b are separated for individual chips to perform the emulation. A terminal of a part of a peripheral circuit for the microcomputer (a peripheral evaluation chip) 20b must therefore be used as a terminal for establishing a connection with an evaluation emulation chip 21b (referred to as a CPU evaluation chip hereinbelow) which fetches the internal information of the CPU outside the peripheral evaluation chip. That is, at the time of emulation, the CPU within the peripheral evaluation chip 20b is cut off, and the information for the CPU is monitored and controlled by the CPU evaluation chip 21b. However, the CPU within the peripheral evaluation chip 20b during the emulation is not illustrated. The peripheral evaluation chip therefore requires terminals, which are essentially necessary as functions of the peripheral circuit, except an input/output terminal of an I/O port or the like, on behalf of the CPU evaluation chip 21b. However, because of the limitation due to the IC package size in the peripheral evaluation chip 20b or the restriction of a number of terminals, all the terminals required for controlling the peripheral functions which are employed when used as an actual product can not be fetched outside the peripheral evaluation chip 20b. Thus, it is impossible to emulate all the unused terminal functions of the target board and the peripheral evaluation chip 20b to which the target board is connected as they are. In order to effect the emulation which is close to the unused state with respect to the target board, a number of terminals attaining the connection between the peripheral evaluation chip 20b and the CPU evaluation chip 21b must therefore be decreased. For reducing a number of terminals establishing the connection between the peripheral evaluation chip 20b and the CPU evaluation chip 21b, there has been conventionally employed a means such that signals (referred to as control signals herein-below) transmitted and/or received between the peripheral evaluation chip 20b and the CPU evaluation chip 21b are decoded and encoded within the peripheral evaluation chip 20b and the CPU evaluation chip 21b.

FIG. 13 illustrates a structure of a connection achieved between the peripheral evaluation chip 20b and the CPU evaluation chip 21b relating to the interruption. With reference to FIG. 13, a difference between the respective processing of the emulation apparatus and the one-chip microcomputer at the time of interrupt processing will be explained. As different from the one-chip microcomputer, in the emulation apparatus, since the INTC 2b exists within the peripheral evaluation chip 20b and the CPU 3b is provided within the CPU evaluation chip 21b, the INTC 2b and the CPU 3b are connected with each other through terminals establishing the connection between the peripheral evaluation chip 20b and the CPU evaluation chip 21b. That is, the CPU within the peripheral evaluation chip 20b is cut off from the INTC 2b during the emulation. As mentioned above, in the emulation with respect to the target board, since a number of terminals connecting the peripheral evaluation chip and the target board with each other can be increased if a number of connection terminals provided between the CPU evaluation chip and the peripheral evaluation chip is small, the more accurate emulation can be carried out. Thus, the control signals (the INTRQ 6b, the MSINTB 9b, the CSEN 10b and others in this example) transmitted to the CPU evaluation chip 21b within the peripheral evaluation chip 20b have been encoded to be sent to the CPU evaluation chip 21b and the control signals have been decoded within the CPU evaluation chip 21b in the prior art. Further, as a contrary operation, the control signals transmitted to the peripheral evaluation chip 20b within the CPU evaluation chip 21b (the CLRIF 12b, the CLRMS 13b, the CLRIP 14b, the OEVC 29 and others in this instance) have been encoded to be fed to the peripheral evaluation chip 20b and the controls signals have been decoded within the peripheral evaluation chip 20b so that a number of connection terminals provided between the peripheral evaluation chip 20b and the CPU evaluation chip 21 might be decreased.

Note that the operation timing if the emulation apparatus is configured is the same with that in the case of the one-chip microcomputer illustrated in FIG. 12.

In the above-mentioned connection attained between the INTC and the CPU in the conventional one-chip microcomputer, since a plurality of control signal lines are required, there occurs a problem such that the wiring area increases due to the extension of the signal wires or the signal input/output circuit becomes large in size.

Further, in the above-described conventional emulator apparatus, since a decoder and an encoder are required as means for reducing a number of connection terminals which relate to the interruption and are provided between the peripheral evaluation chip 1b and the CPU evaluation chip 2b, there are disadvantages such that 1) the scale of the circuit increases, 2) the decoder and the encoder obstruct the high speed operation, and 3) pulse noises generated during the decoding and encoding lead to the malfunction. Furthermore, the decoder and the encoder must be additionally provided at a stage of designing the one-chip microcomputer. Moreover, the connection between the CPU 3b and the INTC 2c at a stage of designing the one-chip microcomputer is different from the connection between the CPU 3b and the INTC 2b during the emulation. The one-chip microcomputer 1b having no disadvantage during the emulation may have a failure due to an erroneous wiring between the CPU 3b and the INTC 2b after the decoder and the encoder are removed. That is because no emulation is performed by using the CPU 3b and the INTC 2b after removing the decoder and the encoder therefrom. Accordingly, the connection in the microcomputer is different from that in the emulator, there is such a drawback that advantages may be likely to be produced.

SUMMARY OF THE INVENTION

It is therefore an object of the present invention to provide an improved apparatus in which the number of interconnections between a CPU and an INTC is reduced.

An information processing apparatus according to the present invention comprises a central processing unit (CPU), an interrupt control unit (INTC), a bus for transferring data between the CPU and INTC, an interrupt request line for transmitting an interrupt request signal from the INTC to the CPU when the INTC received an interrupt operation request from a peripheral unit; and an interrupt reception signal line for notifying the INTC of the CPU allowing an interrupt operation, thereby the INTC transmitting to the CPU through the bus vector address information together with a mode signal representing a mode of interruption.

With such an arrangement, the number of interconnection lines for connecting the INTC and the CPU can be reduced. This means that the number of terminals for interconnection in an in-circuit emulator can be also reduced, resulting in performing the emulation with a high accuracy. Further, since there is no need to provide a decoder and an encoder within the first data processing portion and the second data processing portion, the scales of the first data processing portion and the second data processing portion can be decreased and the operation speed can be also enhanced.

BRIEF DESCRIPTION OF THE DRAWINGS

The above and other objects, features and advantages of the invention will be best understood by reference to the following detailed description taken in conjunction with the accompanying drawings, wherein.

DESCRIPTION OF THE PREFERRED EMBODIMENTS

A description will now be given as to embodiments according to the present invention with reference to the accompanying drawings.

Figure 1:
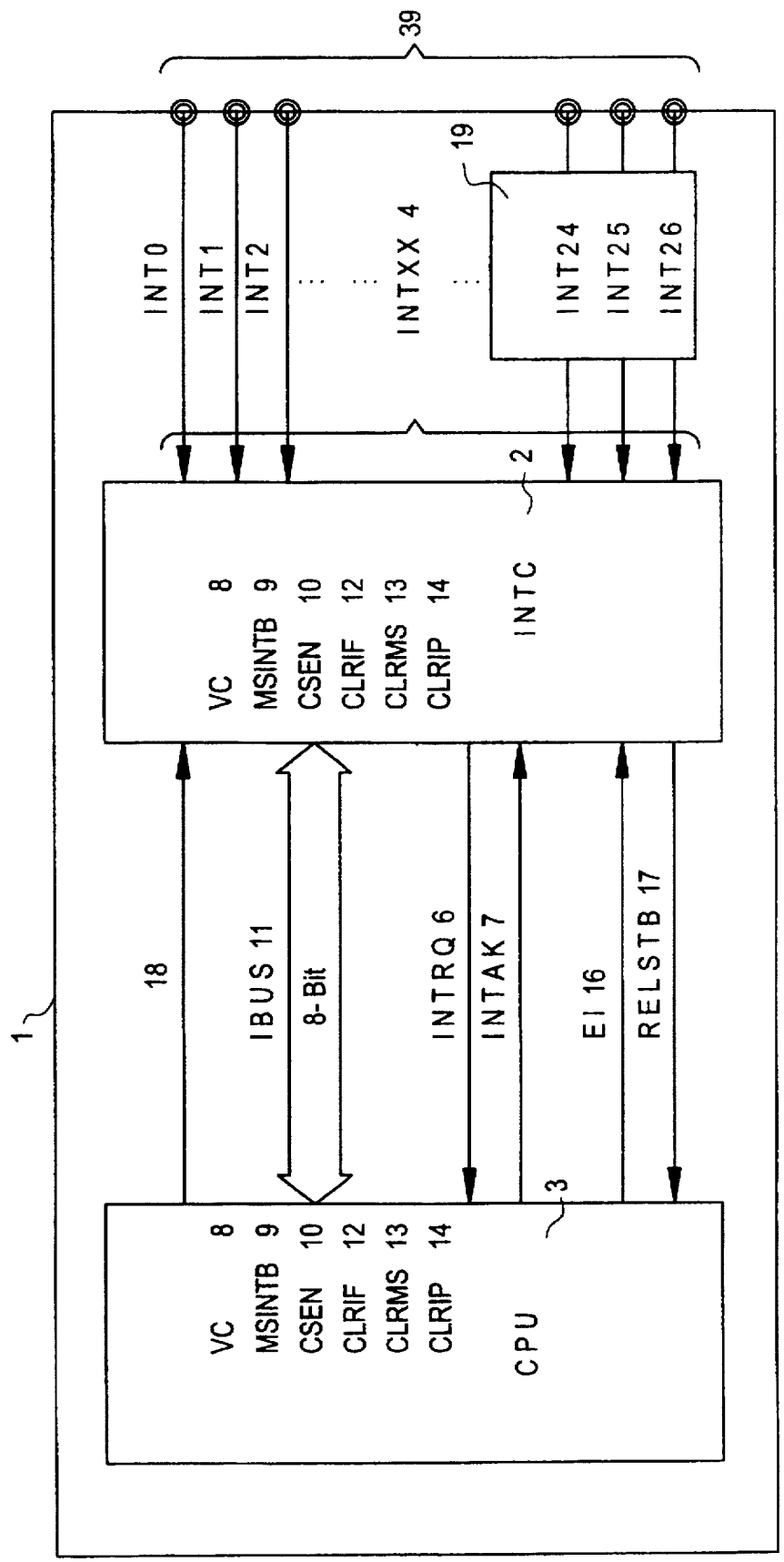
FIG. 1 is a block diagram showing a one-chip microcomputer which is a first embodiment according to the present invention.
Figure 2:
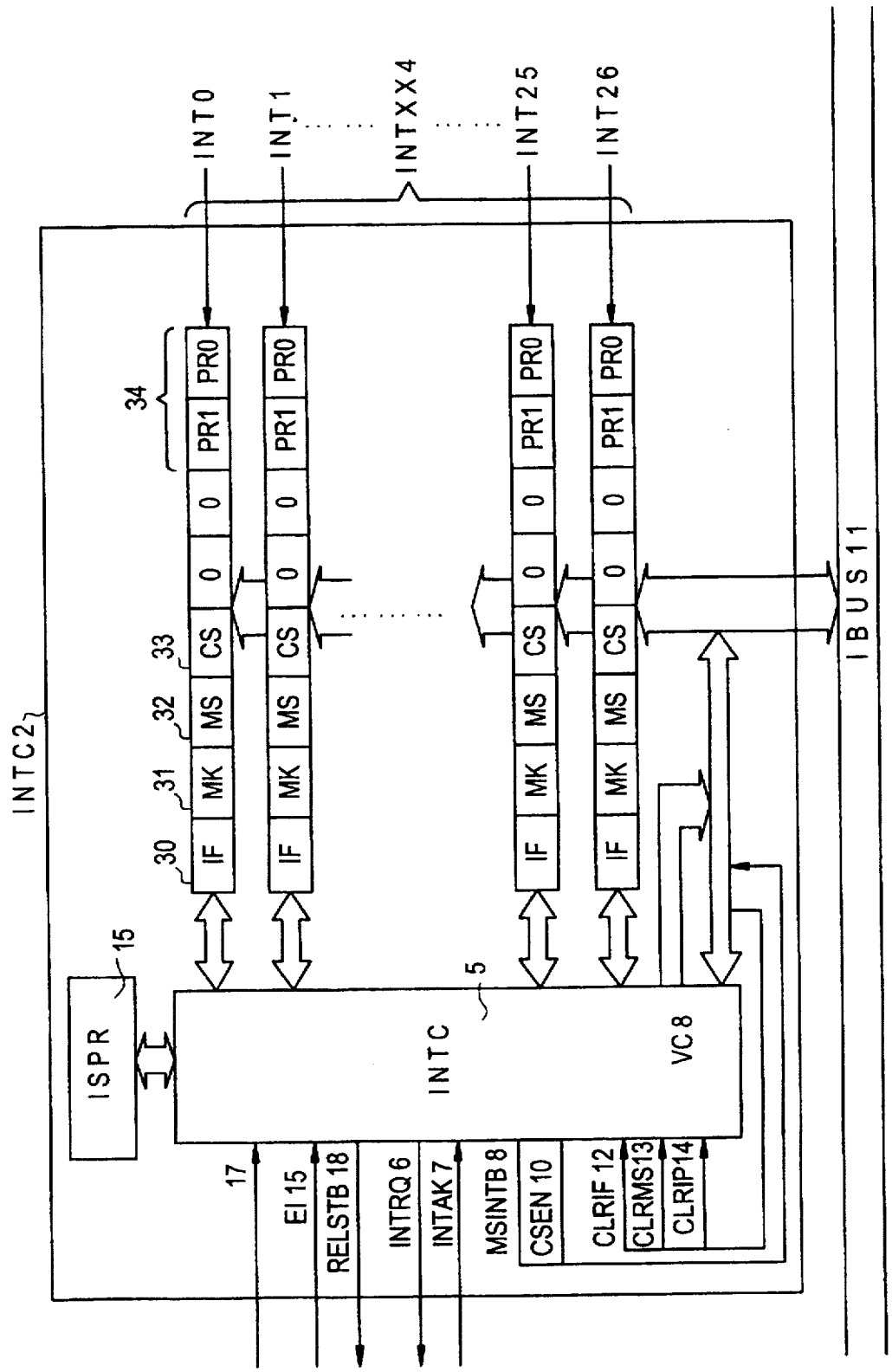
FIG. 2 is a circuit diagram of an interrupt control circuit in the first embodiment.
Figure 3:
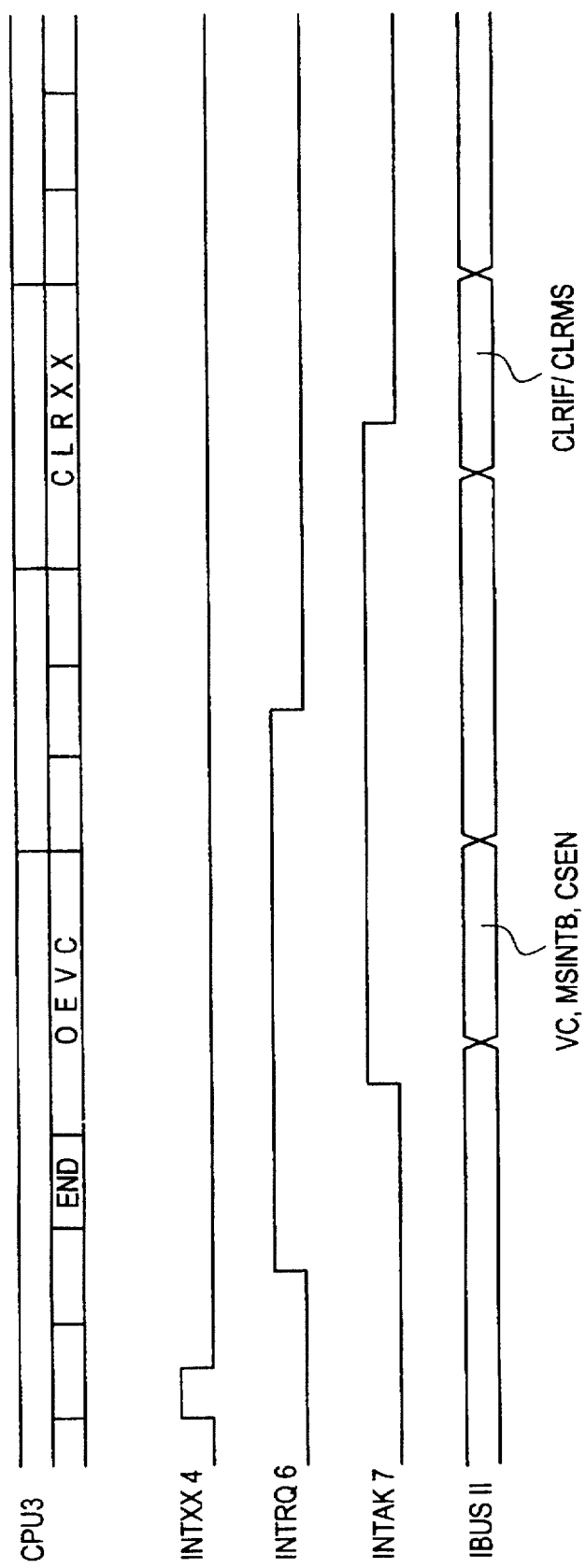
FIG. 3 is a timing chart showing the operation in the case where the interruption has occurred in the microcomputer in the first embodiment.

FIG. 1 is a block diagram showing a one-chip microcomputer which is an embodiment according to the present invention; FIG. 2, a circuit diagram showing an interrupt control circuit; FIG. 3, a timing chart showing the operation of the one-chip microcomputer illustrated in FIG. 1 in the case where the interruption has occurred; and FIG. 4, a circuit diagram showing a primary part in the one-chip microcomputer illustrated in FIG. 1.

Figure 10:
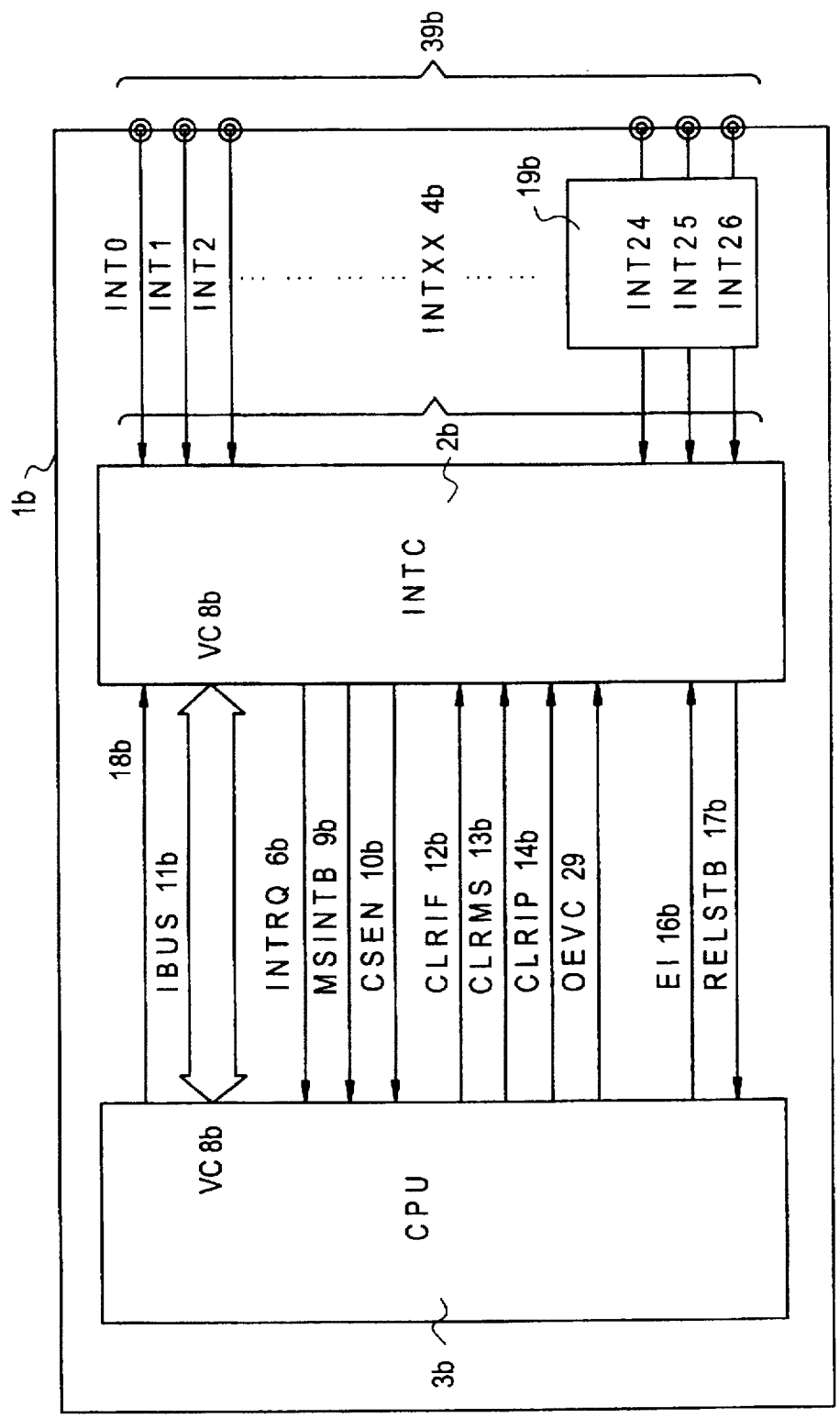
FIG. 10 is a block diagram showing a one-chip microcomputer which is a first conventional example.
Figure 11:
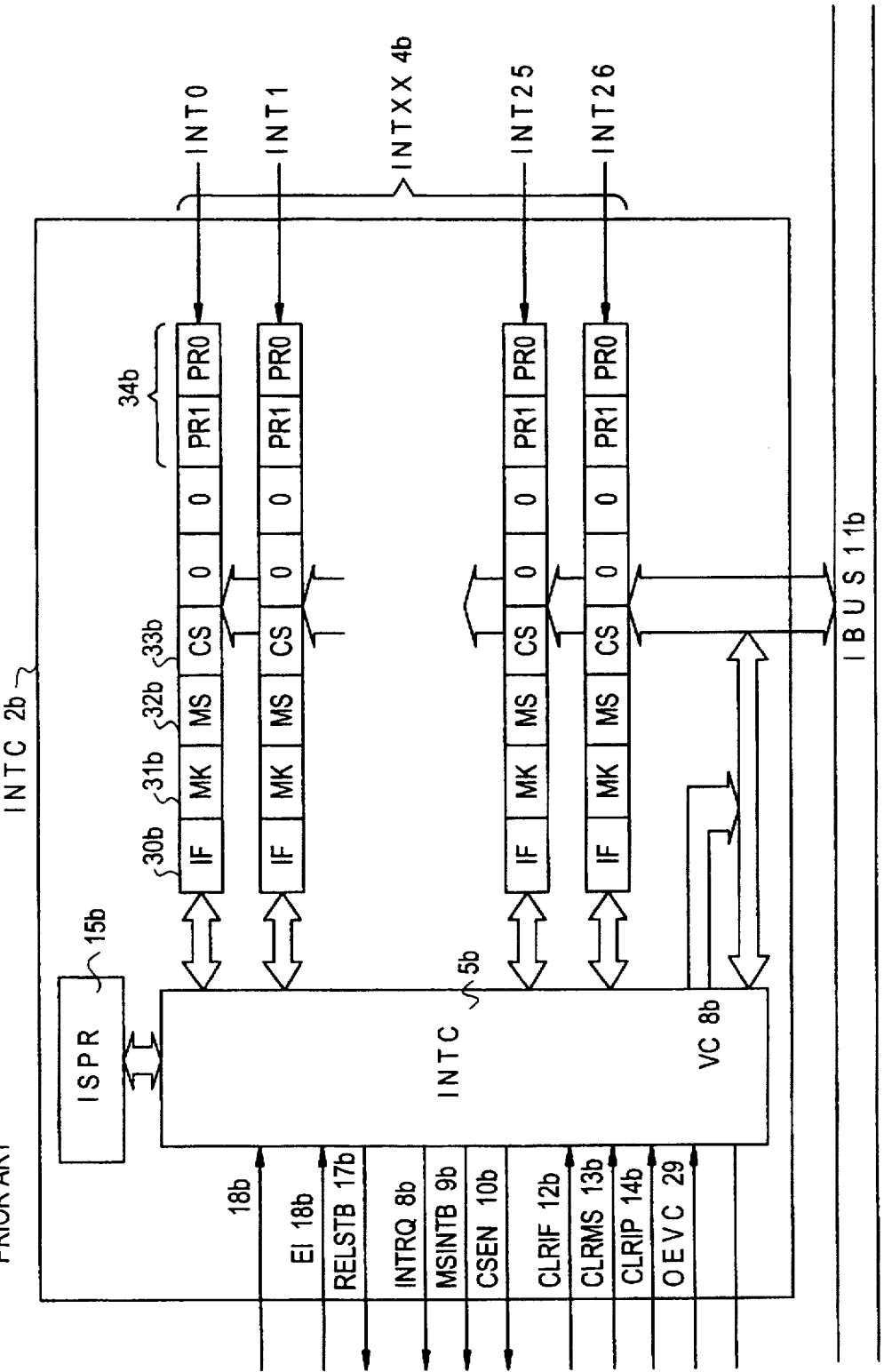
FIG. 11 is a circuit diagram showing an interrupt control circuit in the first conventional example.
Figure 12:
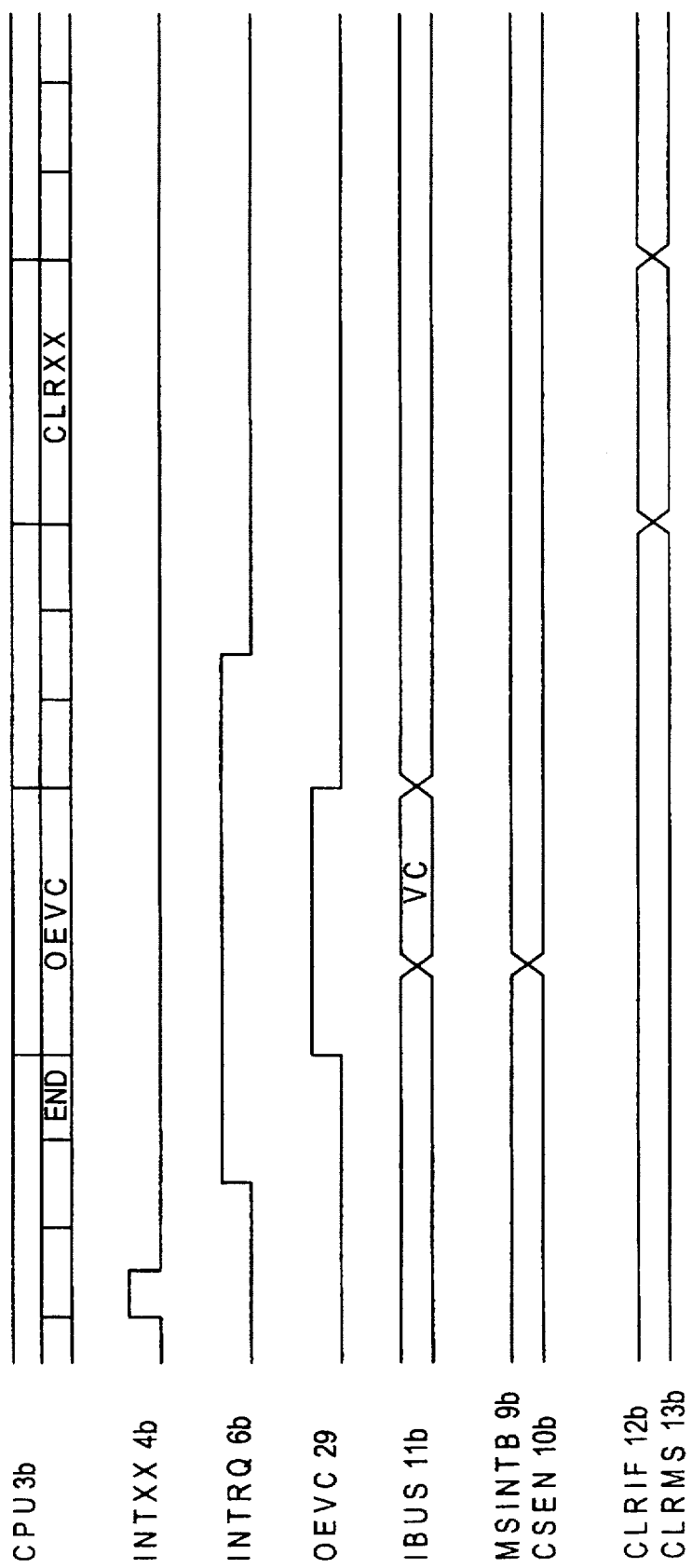
FIG. 12 is a timing chart showing the operation in the case where the interruption has occurred in the first conventional example.
Figure 13:
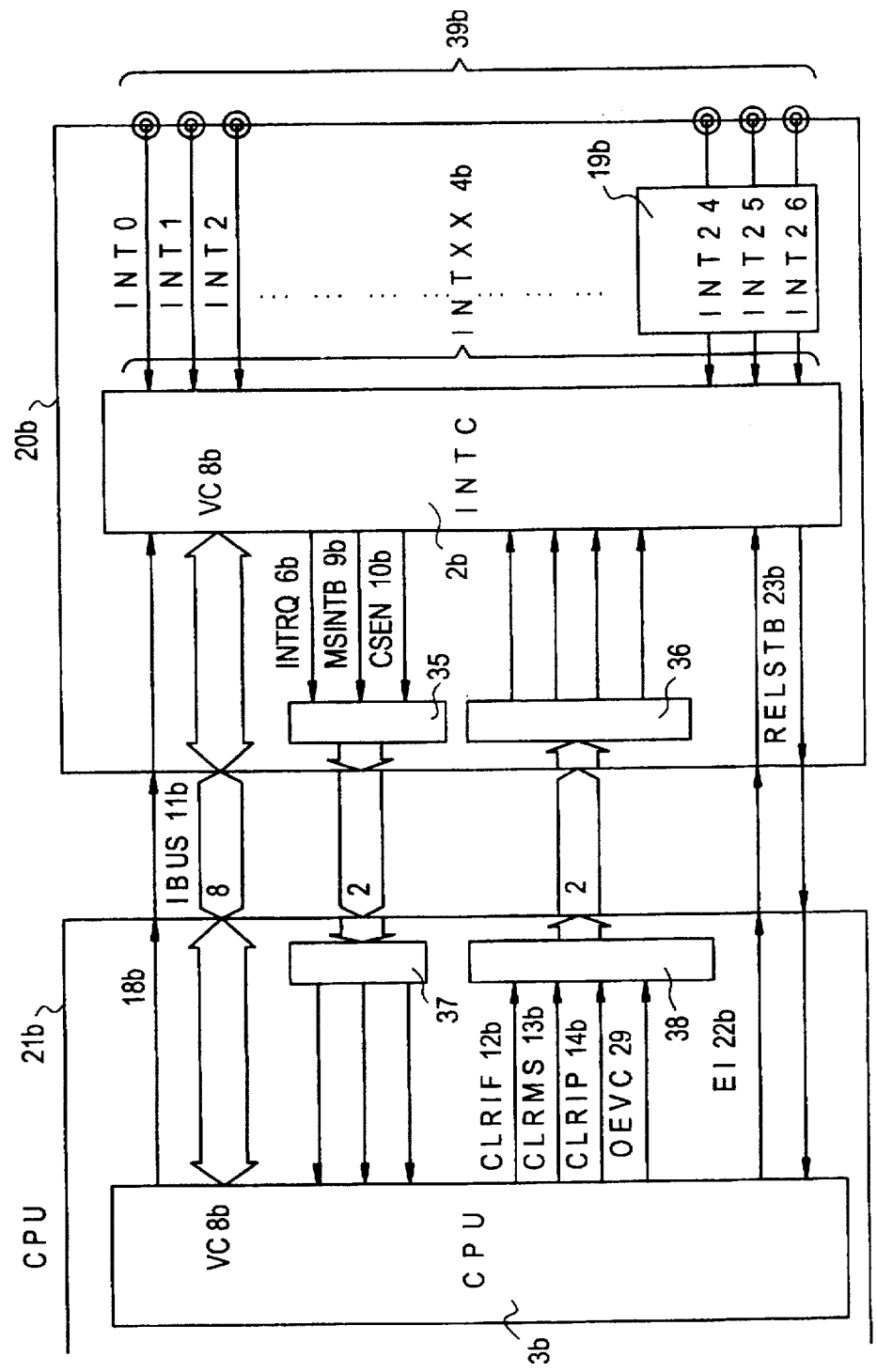
FIG. 13 is a diagram showing a connection achieved between a peripheral evaluation chip and a CPU evaluation chip which constitute an emulation apparatus in a second conventional example.

As illustrated in FIG. 1, to the connection diagram showing the connection made between the INTC 2 and the CPU 3 according to this embodiment is added one signal line which outputs as data control signals (an MSINTB 9, a CSEN 10, a CLRIF 12, a CLRMS 13 and a CLRIP 14) in the prior art circuit shown in FIG. 10 to an IBUS 11 and transmits an interrupt reception signal 7 (referred to as an INTAK hereinbelow) as a substitution for an OEVC 29 without using control signal lines for transmitting these control signals.

A difference of the processing of the INTC 2 from that of the INTC 2b that is a conventional example will be explained with reference to FIG. 2. An INTC control portion 5 similarly outputs an INTRQ 6 as in the conventional example, thus omitting the explanation thereabout. Upon detecting a leading edge of an INTAK 7 which is generated in response to the INTRQ 6, the INTC control portion 5 outputs as data a VC 8, the MSINTB 9 and the CSEN 10 to the IBUS 11. The IBUS 11 is composed of eight bits and used as a data bus. Here, as different from any other address information, the vector address VC 8 does not usually require eight bits and is capable of transmitting $2^6=64$ kinds of 6-bit vector information. That is, the vector address VC 8 does not exclusively possess all the bits of the data bus. Thus, the available two bits can be utilized to transmit and/or receive the interrupt processing mode information.

Further, the INTC control portion 5 fetches the CLRIF 12 and the CLRMS 13 supplied through the IBUS 11 with a timing at which the INTAK 7 shows a last transition. On the basis of the data, the INTC control portion 5 cancels the corresponding flags IF 30 and MS 32. Furthermore, when the interrupt processing performed on the basis of the VC 8, the MSINTB 9 and the CSEN 10 is completed, the CPU 3 outputs the CLRIP 14 to the IBUS 11. Upon receiving the CLRIP 14, the INTC 5 eliminates the data within the corresponding flag ISPR 15b and updates the priority of the interruption.

Figure 4:
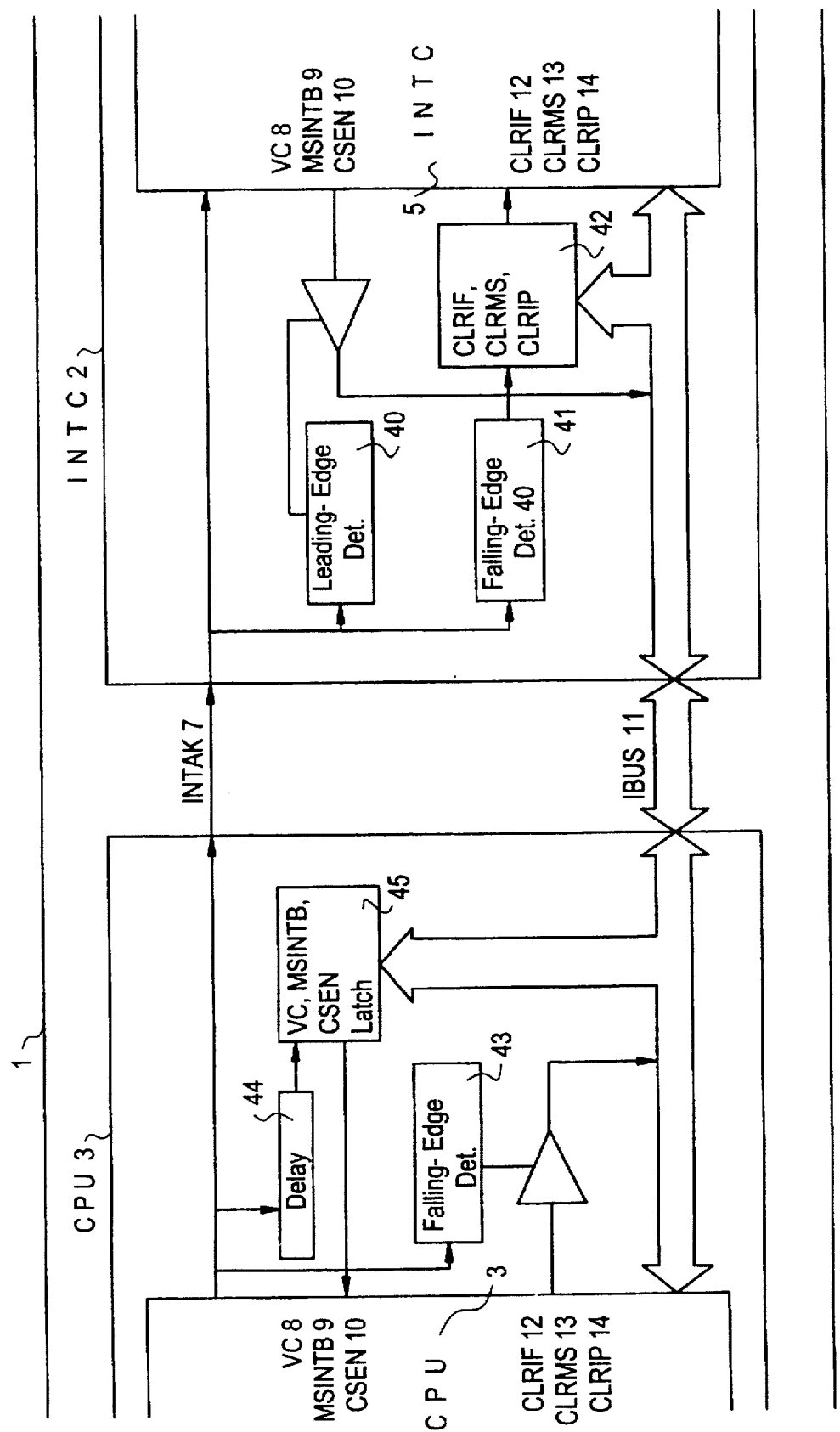
FIG. 4 is a circuit diagram showing a primary part in the first embodiment.

The relationship of the connection established between the CPU 3 and the INTC 2 will be explained in detail with reference to FIG. 4. In the case where the INTAK 7 output from the CPU 3 is turned to "1", on the INTC 2 side, a leading edge detection circuit 40 within the INTC 2 detects the leading edge of the INTAK 7. In response to the leading edge, an output buffer outputs to the IBUS 11 the VC 8, the MSINTB 9 and the CSEN 10 which are output from the INTC control portion 5. Meanwhile, on the CPU side, a delay circuit 44 detects a first transition of the INTAK 7. Also, the delay circuit 44 delays an output of a detection signal until the time when data of the VC 8, the MSINTB 9 and the CSEN 10 are determined and transmits as a latch timing signal the thus-delayed detection signal to a VC/MSINTB/CSEN latch circuit 45. Upon receiving the latch timing signal, the VC/MSINTB/CSEN latch circuit 45 latches data of the VC 8, the MSINTB 9 and the CSEN 10 supplied through the IBUS 11.

Further, when the INTAK 7 output from the CPU 3 is turned to "0" after the lapse of a predetermined time, on the CPU side, a trailing edge detection circuit 43 detects a trailing edge of the INTAK 7 and, in response to the trailing edge, the output buffer outputs the CLRIF 12, the CLRMS 13 and the CLRIP 14 to the IBUS 11. Meanwhile, on the INTC side, a trailing edge detection circuit 41 detects a last transition of the INTAK 7, and a CLRIF/CLRMS latch circuit 42 latches data of the CLRIF 12 and the CLRMS 13 on the IBUS 11 with a timing of the detection.

The processing at the time of interruption will now be described in connection with FIGS. 1 and 3. The processing carried out until the INTC 2 turns the INTRQ 6 to "1" is the same with that in the prior art, thereby omitting the explanation thereabout. When the INTC 2 turns the INTRQ 6 to "1" and the CPU 3 receives the INTRQ 6, the CPU 3 turns to "1" the INTAK 7 which is a request signal for requesting the VC 8, the MSINTB 9 and the CSEN 10. Upon detecting the leading edge of the INTAK 7, the INTC 2 outputs to the IBUS 11 the VC 8, the MSINTB 9 and the CSEN 10 as data. The CPU 3 executes the interrupt processing on the basis of these data. After the lapse of a predetermined time, the CPU 3 turns the INTAK 7 to "0" and simultaneously outputs to the IBUS 11 the CLRIF 12 and the CLRMS 13, and the INTC 2 fetches the CLRIF 12 and the CLRMS 13 with a timing at which the INTAK 7 shows the last transition. In accordance with these data, the INTC 2 cancels the corresponding flag. As mentioned above, in the connection made between the INTC 2 and the CPU 3 within the microcomputer, a number of control signal lines that have used to transmit the MSINT 9 and the CSEN 10 between the INTC 2 and the CPU 3 can be reduced by outputting the VC 8 together with the MSINT 9 and the CSEN 10 to an existing data bus and sending a timing signal separately from these output signals when transmitting and/or receiving a plurality of control signals, thereby decreasing a number of terminals.

Figure 5:
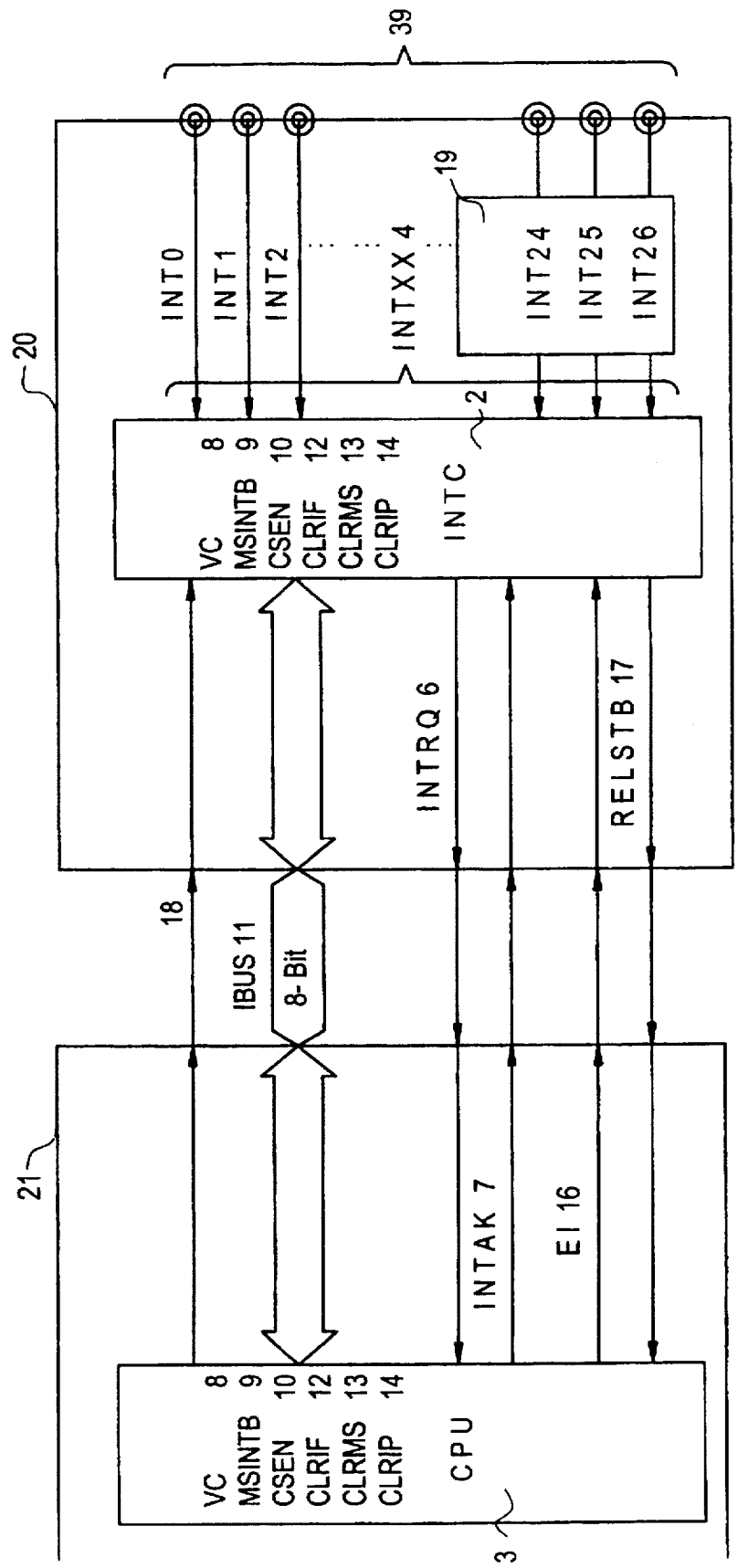
FIG. 5 is a block diagram showing a peripheral evaluation chip and a CPU evaluation chip in an emulation apparatus in a microcomputer which is a second embodiment according to the present invention.

A description will now be give as to an emulation apparatus which is an embodiment according to the present invention in connection with the drawings. In this embodiment, the emulation apparatus is constituted by using the one-chip microcomputer described in the former embodied example. FIG. 5 is a diagram showing a connection made between a peripheral evaluation chip 20 and a CPU evaluation chip 21 which relates to the interruption of a second embodiment according to the present invention.

As shown in FIG. 5. in the drawing of the connection established between the peripheral evaluation chip 20 and the CPU evaluation chip 21 which relates to the interruption of this embodiment, data of the control signal lines are transmitted and/or received via the IBUS 11; the conventional OEVC 29 is eliminated; and an INTAK 7 is additionally provided.

The processing at the time of interruption will now be explained in connection with FIG. 4.

The peripheral evaluation chip 20 similarly outputs the INTRQ 6 as in the prior art. thus omitting the explanation thereabout. Upon detecting a leading edge of the INTAK 7 generated in response to the INTRQ 6. the peripheral evaluation chip 20 outputs to the IBUS 11 the VC 8. the MSINTB 9 and the CSEN 10 as data. The CPU evaluation chip 21 performs the interrupt processing in accordance with these signals. During the interrupt processing, the CPU evaluation chip 21 turns the INTAK to "0" after the elapse of a predetermined time and simultaneously outputs to the IBUS 11 the CLRIF 12 and the CLRMS 13. Further, the peripheral evaluation chip 20 fetches the thus-output data with a timing at which the INTAK 7 shows a last transition, and cancels the corresponding flags IF and MS on the basis of the data. Furthermore, when the interrupt processing is completed, the CPU evaluation chip 21 outputs the CLRIP 14 to the IBUS 11. The peripheral evaluation chip 20 updates the content of the ISPR upon receiving the CLRIP 14.

Note that the operation timing is the same with that of the one-chip microcomputer illustrated in FIG. 3.

As described above, in the connection made between the peripheral evaluation chip 20 and the CPU evaluation chip 21 which relates to the interruption, when a plurality of control signals are transmitted, a number terminals for connecting the peripheral evaluation chip 20 and the CPU evaluation chip 21 with each other can be reduced by transferring the MSINT 9 and the CSEN 10 together with the VC 8 on the existing data bus and transmitting only a timing signal separately from these data. For example, in this embodiment, the four control lines which have been required in the bidirectional direction in the prior art can be reduced to two. As a result, a number of terminals connecting the target board and the peripheral evaluation chip can be increased, thus enabling the more accurate emulation. In addition. since the decoder and the encoder are no longer necessary, the scale of the circuit can be decreased. Also, there are such advantages that an obstacle to the high speed operation is eliminated and the noise is prevented. For example, in this embodiment, the delayed time corresponding to the time taken by approximately four gates can be shortened. Further, since there is no longer need to additionally provide the decoder and the encoder at the stage of designing the one-chip microcomputer, this embodiment has also an advantage such that a defect caused when the connection of the microcomputer is different from that of the emulator is not likely to be produced.

A third embodiment according to the present invention will now be described with reference to the drawings.

Figure 6:
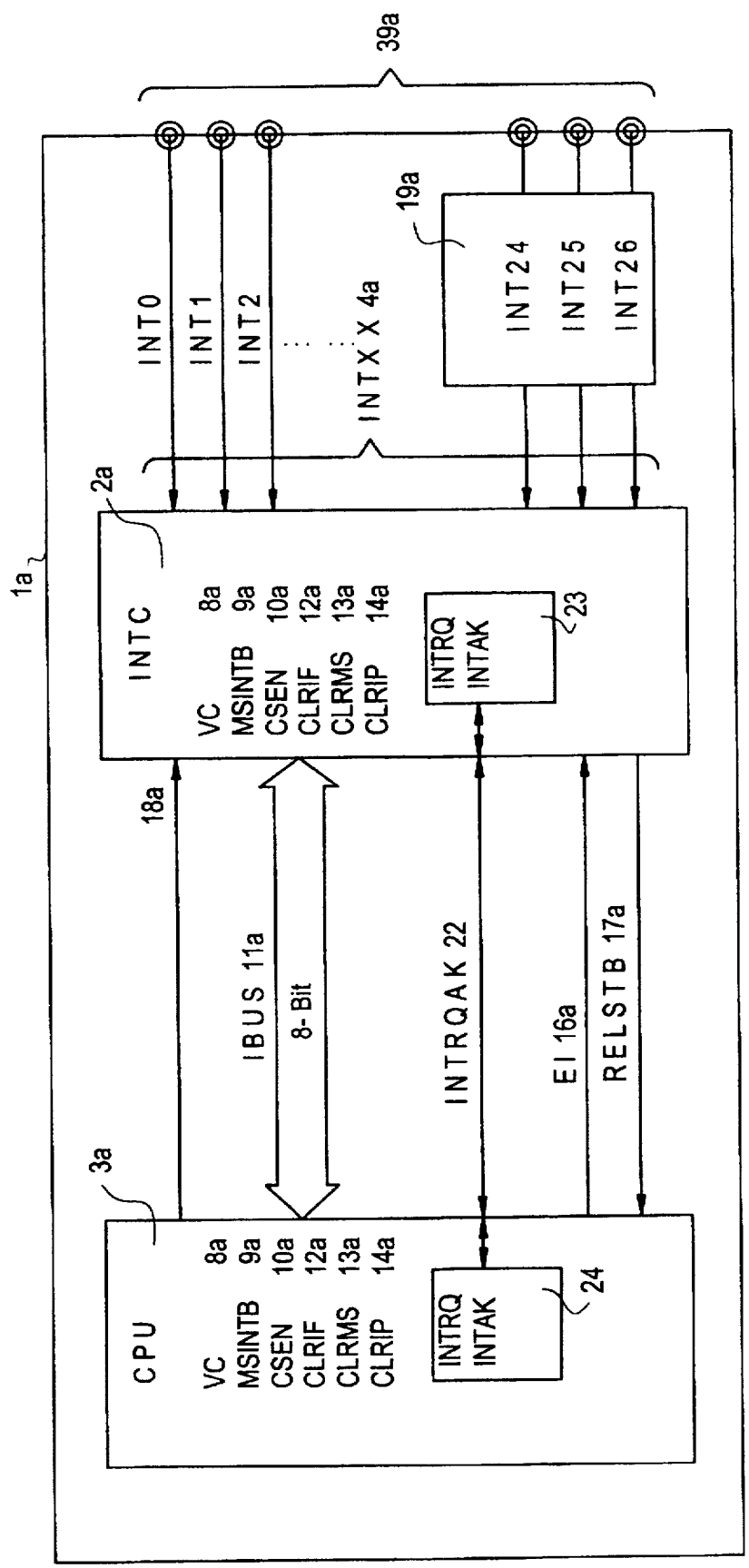
FIG. 6 is a block diagram showing a one-chip microcomputer which is a third embodiment according to the present invention.
Figure 7:
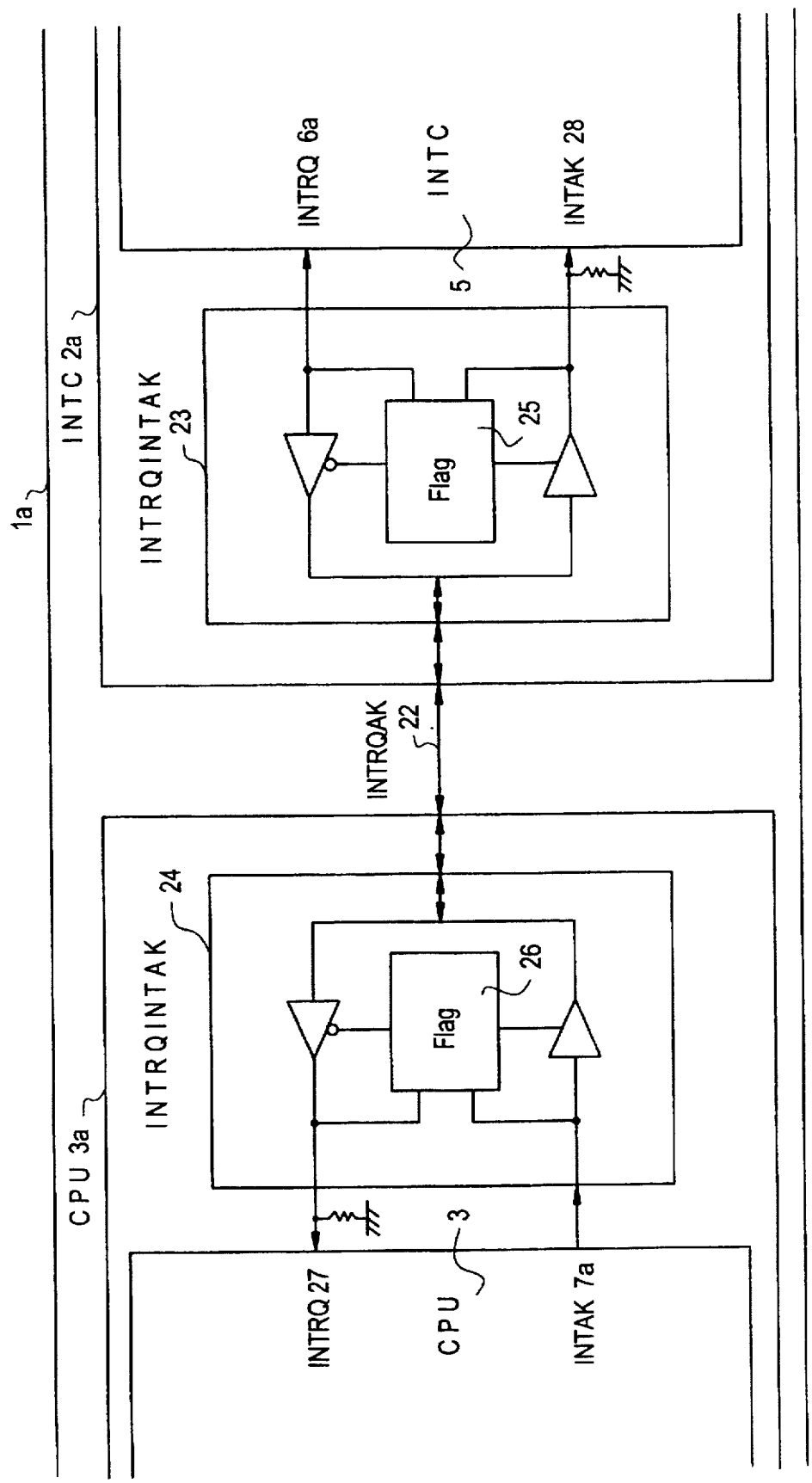
FIG. 7 is a diagram of a connection established between an INTC and the CPU in a part showing a difference between FIGS. 1 and 5.

FIG. 6 is a block diagram showing a one-chip microcomputer according to the third embodiment according to the present invention; FIG. 7. a diagram showing a connection established between an INTC 2a and a CPU 3a in a part different from the first embodiment; and FIG. 8. a timing chart in FIG. 6 according to the present invention in the case where the interruption has occurred.

As shown in FIG. 6. in the block diagram illustrating the one-chip microcomputer of this embodiment, the INTRQ 6a and the INTAK 7a in the connection diagram explained in connection with FIG. 1 are replaced with one signal line 22 (referred to as an INTRQAK hereinbelow) capable of bidirectional transmission and reception by providing INTRQINTAK generation circuits 23 and 24 each having a transmission/reception switching flag to the INTC 2 and the CPU 3. Namely, since both the INTRQ 6 and the INTAK 7 are not used at the same time, the transmission and/or reception are enabled by one bidirectional signal line 22.

The operation of the INTRQINTAK generation circuits 23 and 24 with which the INTC 2a and the CPU 3a are provided respectively will be explained in connection with FIG. 7. The INTRQAK 22 transmits and/or receives the INTRQ 6a and the INTAK 7a by the bidirectional signal line. Each of transmission/reception switching flags 25 and 26 is a flag for determining a direction in which the INTRQAK 22 is transmitted and/or received. In this embodiment, if each of the transmission/reception switching flags 25 and 26 is "0", the INTRQAK 22 is transmitted as the INTRQ 6a and 27 from the INTC 2a to the CPU 3a and, on the other hand, if each of the transmission/reception switching flags 25 and 26 is "1", the INTRQAK 22 is transmitted as INTAK 7a and 28 from the CPU 3a to the INTC 2a. Further, since the transmission/reception switching flag 25 and 26 are usually waiting for the INTRQ 6a and 27, they are being turned to "0". In accordance with the first transition of the INTRQ 6a, the INTRQINTAK generation circuit 23 within the INTC 2a turns the INTRQAK 22 to "1". Then, after one clock, the INTRQINTAK generation circuit 23 turns the transmission/reception switching flag 25 to "1" and enters the state waiting for the INTRQAK 22 to be input thereto. Furthermore, on the basis of the first transition of the INTRQAK 22, the INTRQINTAK generation circuit 24 within the CPU 3a turns the transmission/reception switching flag 26 to "1" after one clock and enters the state for transmitting the INTRQAK 22. In this state, the INTRQINTAK generation circuit 24 turns the INTRQAK 22 to "1" in accordance with the first transition of the INTAK 7a. Moreover, the INTRQINTAK generation circuit 24 turns the transmission/reception switching flag 26 to "0" in correspondence with a last transition of the INTAK 7a and enters the state waiting for the INTRQAK 22 to be input thereto. In addition, the INTRQINTAK generation circuit 23 turns the transmission/reception switching flag to "0" in response to the last transition of the INTRQAK 22 and is brought to the state for transmitting the INTRQAK 22.

A description will now be given as to the processing at the time of interruption with reference to FIG. 6.

When the INTXX 4a is input to the INTC 2a, the INTC 2a judges whether the reception of interruption is enabled. If the interrupt reception is enabled, the INTRQINTAK generation circuit 23 turns the INTRQAK 22 to "1" and, after one clock, the circuit 23 enters the state waiting for the INTRQAK 22 to be input thereto. Further, after one clock, the INTRQINTAK generation circuit 24 turns the INTRQAK 22 to "1" in accordance with the first transition of the INTRQAK 22. Upon detecting the first transition of the INTRQAK 22, the INTC 2a outputs the VC 8a, the MSINTB 9a and the CSEN 10a as data to the IBUS 11a. The CPU 3a performs the interrupt processing on the basis of these data. Furthermore, the CPU 3a outputs the CLRIF 12a and the CLRMS 13a to the IBUS 11a and turns the INTRQAK 22 to "0". In response to the last transition of the INTRQAK 22, the INTRQINTAK generation circuit 22 fetches the data of the IBUS 11a. On the basis of the data, the INTC 2a cancels the corresponding flag.

As mentioned above, the method for connecting the INTC 2a and the CPU 3a with each other according to the third embodiment can reduce not only a number of connection terminals by using the timing signal described in connection with the first embodiment and transferring the data of the control signals on the existing bus but also one timing signal by using flags, thereby decreasing a number of wires within the circuit.

An emulation apparatus which is a fourth embodiment according to the present invention will now be described with reference to the drawings. In this embodiment, the emulation apparatus is constituted by using the one-chip microcomputer explained in connection with the third embodiment.

Figure 9:
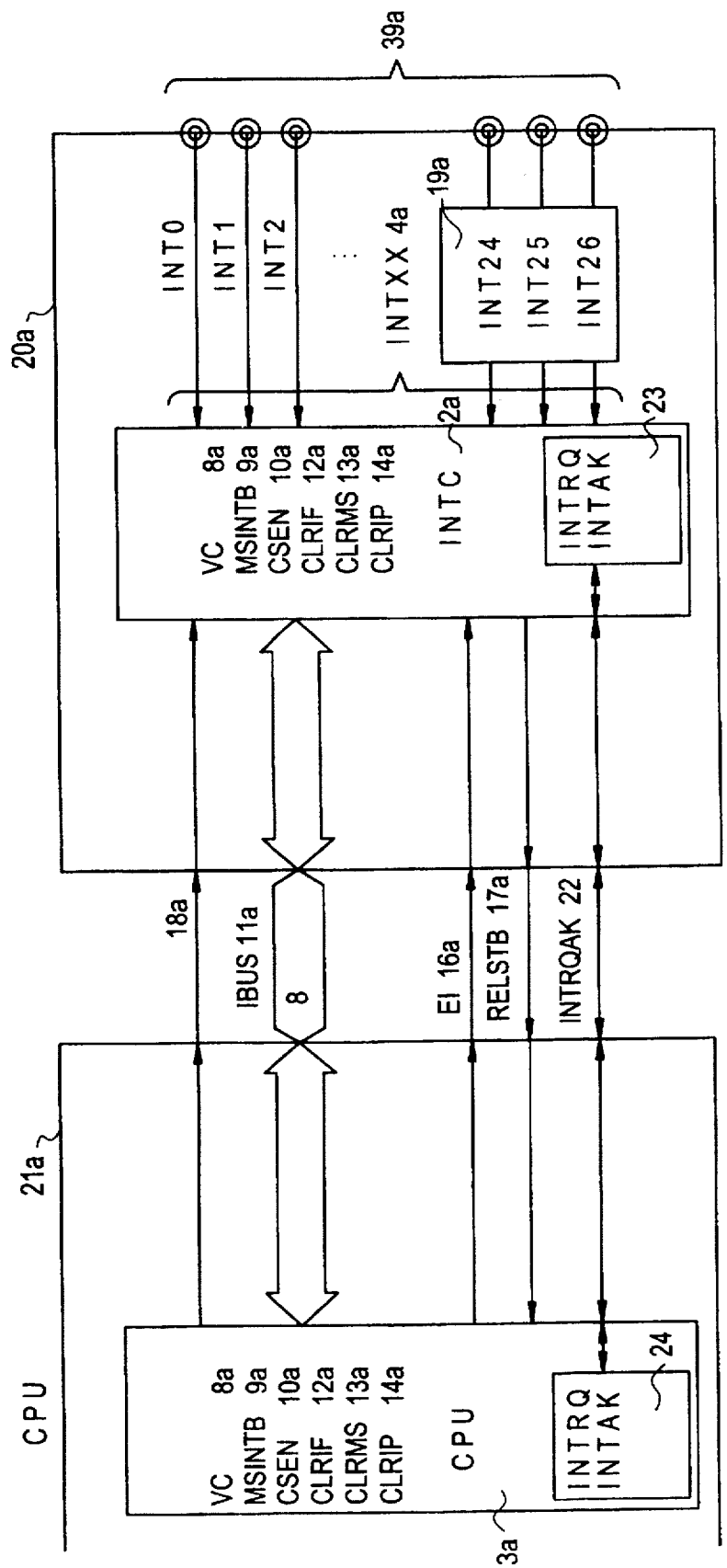
FIG. 9 is a diagram showing a connection attained between the peripheral evaluation chip and the CPU evaluation chip which constitute in the third apparatus in the third embodiment according to the present invention.

FIG. 9 is a diagram showing the connection established between the peripheral evaluation chip 20a and the CPU evaluation chip 21a which relates to the interruption of the third embodiment according to the present invention.

As illustrated in FIG. 9, in the diagram showing the connection made between the peripheral evaluation chip 20a and the CPU evaluation chip 21a which relates to the interruption of this embodiment, the INTRQ 6a and the INTAK 7a in the connection diagram explained with reference to FIG. 5 are replaced with an INTRQAK 22 by providing INTRQINTAK generation circuits 23 and 24 each having a transmission/reception switching flag to the respective evaluation chips.

The processing at the time of interruption will now be described in connection with FIG. 9.

When an INTXX 4a is input to the INTC 2a within the peripheral evaluation chip 20a, the peripheral evaluation chip 20a judges whether the reception of interruption is enabled. If the interrupt reception is enabled, the peripheral evaluation chip 20a turns the INTRQAK 22 which is an output from the INTRQINTAK generation circuit 23 to "1" and, after one clock, it enters the state waiting the INTRQAK 22 to be input thereto. Further, in accordance with the first transition of the INTRQAK 22, the CPU evaluation chip 21a is turned into the state for transmitting the INTRQAK, after one clock. At this time, upon receiving the interruption, the CPU evaluation chip 21a turns the INTRQAK 22 to "1". When the first transition of the INTRQAK 22 is detected, the peripheral evaluation chip 20a outputs the VC 8, the MSINTB 9a and the CSEN 10a as data to the IBUS 11a. The CPU evaluation chip 21a carries out the interrupt processing on the basis of these data. Furthermore, the CPU evaluation chip 21a outputs any data of the CLRIF 12a, the CLRMS 13a and the CLRIP 14a to the IBUS 11a and turns the INTRQAK 22 to "0". In response to the last transition of the INTRQAK 22, the peripheral evaluation chip 20a fetches the data of the IBUS 11a and cancels the corresponding flag in accordance with the thus-fetched data.

Figure 8:
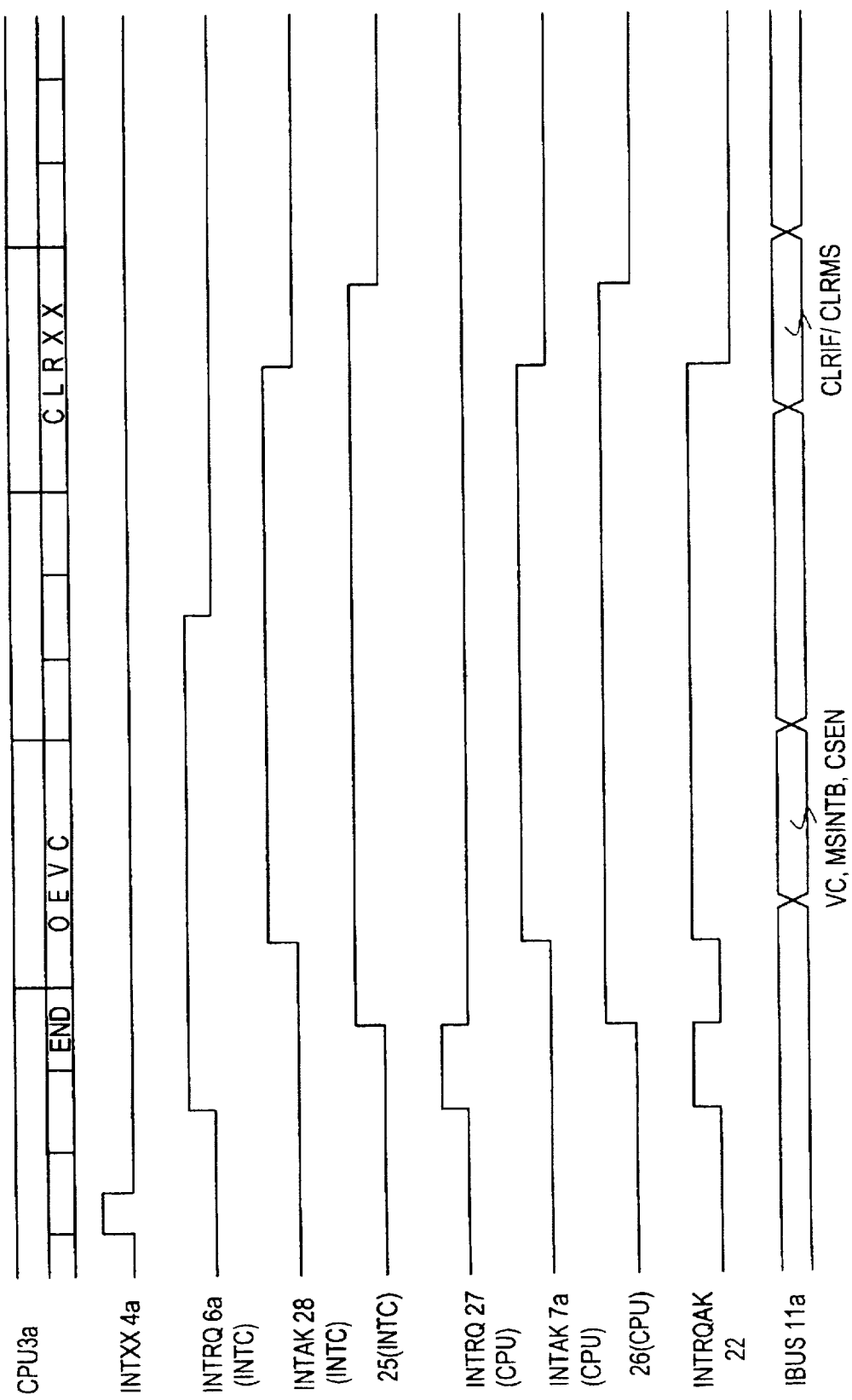
FIG. 8 is a timing chart showing the operation in the case where the interruption has occurred in the microcomputer in the third embodiment.

Note that the operation timing is the same with that of the one-chip microcomputer illustrated in FIG. 8.

As mentioned above, the method for connecting the peripheral evaluation chip 20a and the CPU evaluation chip 21a which relates to the interruption in the fourth embodiment can further reduce not only a number of connection terminals by employing the timing signal described by the third embodiment to transfer the data of the control signals to the existing bus, but also it can reduce one timing signal by using the bidirectional signal lines.

As thus far described, in the connection made between the INTC and the CPU, a number of signals lines for transmission/reception can be reduced by transferring the data to the unused bits of the existing bus and sending the timing signal separately from these data, when transmitting a plurality of control signals. The invention is, therefore, advantageous in that the encoder and the decoder are no longer necessary, thereby decreasing the scale of the circuit.

Also, in the connection made between the peripheral evaluation chip and the CPU evaluation chip which relates to the interruption, since the data are transferred to the existing bus to send only the timing signal in the case where a plurality of control signals are transmitted, a number of terminals connecting the peripheral evaluation chip and the CPU evaluation chip with each other can be reduced. For example, in the embodiments according to the present invention, the four control lines which have been required in the prior art can be reduced to two. As a result, a number of terminals connecting the peripheral evaluation chip and the target board can be increased, and the accurate emulation can be carried out. Further, since the decoder and the encoder are no longer necessary, the scale of the circuit can be made small, and the circuit portion which obstructs the high speed operation is eliminated, thereby increasing the operation speed of the entire system. In the above respective embodiments, the delayed time corresponding to the time taken by approximately four gates can be reduced. In addition, the noise caused during encoding or decoding and the malfunction by the so-called barb can be prevented, thus enhancing the reliability.

Moreover, since there is no longer need to additionally provide the decoder and the encoder at the stage of designing the one-chip microcomputer, there occurs no problem such that a disadvantage in the case where the circuit configuration and the connection of the microcomputer are different from those of the emulator tends to be produced. In addition, as explained in connection with the third embodiment, the wires within the microcomputer can be further reduced by one by restricting a number of timing signals to one.

Further, in the fourth embodiment, a number of connection terminals can be reduced by one by using only one timing signal, whereby a number of terminals making connection with the target board can be increased.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An interrupt processing apparatus comprising:
   an interrupt control unit;
   a central processing unit;
   a bus for transferring data between said interrupt control unit and said central processing unit;
   an interrupt request line which transmits an interrupt request signal to said central processing unit when an interrupt signal is inputted to said interrupt control unit;
   an interrupt knowledge signal line which transmits to said interrupt control unit an interrupt acknowledge signal requesting a vector address which responds to said interrupt signal when said interrupt signal is input to said central processing unit;

a first output buffer which is provided within said interrupt control unit and outputs to said bus said vector address and a control signal required for carrying out an interrupt processing in response to a first edge of said interrupt acknowledge signal;

a first latch circuit which is provided within said central processing unit and latches said vector address and said control signal on said bus in response to said first edge of said interrupt acknowledge signal;

a second output buffer which is provided within said central processing unit and outputs on said bus an interrupt state signal indicating a state of interrupt processing in response to a second edge of said interrupt acknowledge signal different from said first edge of said interrupt acknowledge signal;

a second latch circuit which is provided within said interrupt control unit and latches said interrupt state signal on said bus in response to said second edge of said interrupt acknowledge signal;

a first edge detection circuit which is provided within said interrupt control unit and detects said first edge of said interrupt acknowledge signal;

a second edge detection circuit which is provided within said interrupt control unit and detects said second edge of said interrupt acknowledge signal; and a third edge detection circuit which is provided within said central processing unit and detects said second edge of said interrupt acknowledge signal, said first output buffer outputting to said bus said vector address and said control signal when said first edge detection circuit detects said first edge, said second output buffer outputting to said bus said interrupt state signal when said third edge detection circuit detects said second edge, said first latch circuit latching said vector address and said control signal on said bus in response to said first edge, and said second latch circuit latching said interrupt state signal on said bus when said second edge detection circuit detects said second edge.

2. An information processing apparatus as set forth in claim 1, wherein said interrupt control unit and said central processing unit are fabricated on first and second semiconductor chips separately from each other.

3. An information processing apparatus comprising:

a first data processing portion for outputting an interrupt request signal in response to an interrupt signal;

a second data processing portion for outputting an interrupt acknowledge signal in response to said interrupt request signal;

a bidirectional signal line provided between said first data processing portion and said second data processing portion for transferring said interrupt acknowledge signal and said interrupt request signal;

a first output means which is provided within a first portion together with said first data processing portion and outputs said interrupt request signal to said bidirectional signal line in response to said interrupt request signal; and a second output means which is provided together with said second data processing portion within a second portion different from said first portion for transmitting said interrupt request signal to said second data processing portion in response to said interrupt request signal input through said bidirectional signal line, said second output means outputting said interrupt acknowledge signal in response to said interrupt acknowledge signal when said second data processing portion outputs said interrupt acknowledge signal in response to said interrupt request signal;

said first output means transmitting said interrupt acknowledge signal to said first data processing portion in response to said interrupt acknowledge signal;

said first data processing portion transmitting to said second data processing portion a signal indicating a mode of interruption together with vector address information through a bus in response to said interrupt acknowledge signal.

4. An information processing apparatus comprising:

a first data processing portion for outputting an interrupt request signal in response to an interrupt signal;

a second data processing portion for outputting an interrupt acknowledge signal in response to said interrupt request signal;

a bidirectional signal line provided between said first data processing portion and said second data processing portion for transferring said interrupt acknowledge signal and said interrupt request signal;

a first output means which is provided within a first portion together with said first data processing portion and outputs said interrupt request signal to said bidirectional signal line in response to said interrupt request signal; and a second output means which is provided together with said second data processing portion within a second portion different from said first portion for transmitting said interrupt request signal to said second data processing portion in response to said interrupt request signal input through said bidirectional signal line, said second output means outputting said interrupt acknowledge signal in response to said interrupt acknowledge signal when said second data processing portion outputs said interrupt acknowledge signal in response to said interrupt request signal;

said first output means transmitting said interrupt acknowledge signal to said first data processing portion in response to said interrupt acknowledge signal, said first data processing portion transmitting to said second data processing portion a signal indicating a mode of interruption together with vector address information through a bus in response to said interrupt acknowledge signal;

said first and second portions being provided on separate chips.

5. An information processing apparatus further comprising:

an interrupt control unit a central processing unit, a bus for transferring data between said interrupt control unit and said central processing unit, a first signal line which transmits an interrupt request signal from said interrupt control unit to said central processing unit, said interrupt request signal being produced when said interrupt control unit receives an operation request from a peripheral unit, and a second signal line which transmits an interrupt acknowledge signal from said central processing unit to said interrupt control unit, said interrupt acknowledge signal being indicative of said central processing unit allowing the performance of an interrupt operation in response to said interrupt request signal, said interrupt control unit responding to said interrupt acknowledge signal to supply said central processing unit via said bus with control information designating an interrupt mode and vector address information;

a first output buffer provided within said interrupt control unit and outputting to said bus said vector address information and said control information required for carrying out an interrupt processing in response to a first edge of said interrupt acknowledge signal;

a first latch circuit provided within said central processing unit and latching said vector address information and said control information via said bus in response to said first edge of said interrupt acknowledge signal;

a second output buffer provided within said central processing unit and outputting on said bus an interrupt state signal indicating a state of interrupt processing in response to a second edge of said interrupt acknowledge signal different from said first edge of said interrupt acknowledge signal; and a second latch circuit provided within said interrupt control unit and latching said interrupt state signal via said bus in response to said second edge of said interrupt acknowledge signal.

6. An apparatus as set forth in claim 5, wherein said interrupt control unit outputs said vector address and said control information simultaneously.

7. An information processing apparatus comprising:

an interrupt control unit;

a central processing unit;

a bus for transferring data between said interrupt control unit and said central processing unit;

a bi-directional line which transmits an interrupt request signal from said interrupt control unit to said central processing unit, said interrupt request signal being produced when said interrupt control unit receives an operation request, and said bi-directional line which transmits an interrupt acknowledge signal from said central processing unit to said interrupt control unit, said interrupt acknowledge signal being indicative of said central processing unit allowing the performance of an interrupt operation responsive to said interrupt request signal, said interrupt control unit responding to said interrupt acknowledge signal to supply said central processing unit via said bus with control information designating an interrupt mode and vector address information wherein said interrupt control unit outputs said vector address and said control information simultaneously.

8. An information processing apparatus comprising:

an interrupt control unit a central processing unit, a bus for transferring data between said interrupt control unit and said central processing unit, a first signal line which transmits an interrupt request signal from said interrupt control unit to said central processing unit, said interrupt request signal being produced when said interrupt control unit receives an operation request from a peripheral unit, and a second signal line which transmits an interrupt acknowledge signal from said central processing unit to said interrupt control unit, said interrupt acknowledge signal being indicative of said central processing unit allowing the performance of an interrupt operation in response to said interrupt request signal, said interrupt control unit responding to said interrupt acknowledge signal to supply said central processing unit via said bus with control information designating an interrupt mode and vector address information wherein said bus is composed of a plurality of bus lines, said interrupt mode being supplied via a first part of said bus lines of said bus and said vector address information being supplied via a second part of said bus lines of said bus so that said control information and said vector address information are supplied via said bus to said central processing unit at one time.

* * * * *

UNITED STATES PATENT AND TRADEMARK OFFICE
CERTIFICATE OF CORRECTION

PATENT NO. : 5,797,021
DATED : August 18, 1998
INVENTOR(S) : Masako IDETA

It is certified that error appears in the above-identified patent and that said Letters Patent is hereby corrected as shown below:

Column 5, line 14, delete "in the third apparatus" and insert
--an emulation apparatus--

Signed and Sealed this

Fifteenth Day of June, 1999

Attest:

Q. TODD DICKINSON

*Attesting Officer*  *Acting Commissioner of Patents and Trademarks*